(12) United States Patent
Fogarty

(10) Patent No.: US 6,376,945 B1
(45) Date of Patent: Apr. 23, 2002

(54) COOLING FLOW GAS TRANSITION INSERTS IN STATOR CORE DUCTS AND METHODS OF COOLING A STATOR CORE

(75) Inventor: James Michael Fogarty, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/567,298

(22) Filed: May 8, 2000

(51) Int. Cl.[7] .............................. H02K 3/24; H02K 1/32; H02K 15/02
(52) U.S. Cl. ........................ 310/58; 310/59; 310/60 R; 310/64
(58) Field of Search .............................. 310/52, 58, 59, 310/60 A, 60 R, 64, 65; 29/596–598

(56) References Cited

U.S. PATENT DOCUMENTS

| | | | |
|---|---|---|---|
| 3,597,645 A | * 8/1971 | Duffert et al. | 310/54 |
| 3,835,339 A | * 9/1974 | Laronze | 310/64 |
| 4,028,569 A | * 6/1977 | Towne | 310/64 |
| 4,362,960 A | * 12/1982 | Gillet | 310/65 |
| 4,415,822 A | * 11/1983 | Aiba | 310/59 |
| 5,814,910 A | * 9/1998 | Pelletier | 310/65 |
| 5,869,912 A | * 2/1999 | Andrew et al. | 310/52 |

* cited by examiner

Primary Examiner—Tran Nguyen
(74) Attorney, Agent, or Firm—Nixon & Vanderhye

(57) ABSTRACT

In electrical machines having a stator core formed by groups of stacked laminations spaced axially one from the other to define with spacers therebetween a plurality of radially extending cooling ducts, there is provided transition inserts in the flow passages. The inserts have surfaces which in part define the flow paths and form gradual transition surfaces between the flow path sections to minimize flow losses. The flow path surfaces of the transition inserts may be linear or curvilinear.

11 Claims, 4 Drawing Sheets

COOLING FLOW GAS TRANSITION INSERTS IN STATOR CORE DUCTS AND METHODS OF COOLING A STATOR CORE

BACKGROUND OF THE INVENTION

The present invention relates to cooling flow transition inserts for transitioning gas flow in stator core cooling ducts of electrical machines and particularly relates to cooling flow transition inserts and methods of cooling the stator core which reduce the total pressure losses in the cooling ducts.

In many electrical machines such as generators, particularly large-scale electrical machines, the stator cores must be cooled. It is a common practice to direct cooling gas for flow through a series of generally radially extending ducts that connect between the inner diameter of the stator core and its outer diameter. The ducts extend between sets or groups of laminations lying normal to the machine axis and at axially spaced locations along the stator core. In certain electrical machines, the pressure drop through the stator core can become a limiting aspect of the overall machine cooling system. This is particularly true in air-cooled machines in which air handling is key to the success of the machine.

Cooling gas in these machines generally flows radially inwardly or outwardly and encounters along the flow paths abrupt contractions or expansions, particularly at the bottoms of the stator slots. The stator slots receive the axially extending armature bars about which flow the cooling gas in the ducts. The armature bars pass through the gaps between the groups or sets of laminations in the cooling ducts. A common and current configuration of the armature bars in the slots of large electrical machines generally affords an abrupt flow transition through 90° bends in the flow path caused by the existence of the armature bars in the ducts. These abrupt transitions cause pressure losses in addition to those occurring in the ducts when the cooling gas enters and exits the duct and as it flows along the duct.

With the exception of the friction loss, each of the pressure changes may represent a local increase or decrease in the static pressure. All, however, entail a loss in total pressure. Thus, a portion of system energy is irreversibly converted to heat and appears as a reduction in the efficiency of the overall machine. Consequently, there is a need for apparatus and methods to improve the flow of the cooling gas to minimize the flow losses.

BRIEF SUMMARY OF THE INVENTION

In accordance with a preferred embodiment of the present invention, there is provided a flow transition insert in each cooling duct that enables the flow path to gradually expand and thereby reduce the total pressure loss in the cooling ducts of the stator core. The radially extending cooling ducts which conduct cooling flow both radially inwardly and outwardly at different axial locations along the stator core include first and second radially extending cooling path sections. The first flow path section of each stator slot extends from the radially innermost portion of the core to the radially outermost portion of the armature bars and the second flow path section extends radially outwardly of the first flow path section. Thus, there is a juncture between the first and second flow path sections at the radially outermost portion of the armature bars. Where that juncture typically has an abrupt 90° bend in current electrical machines, a transition insert is provided in the duct at the juncture of those sections and extends into the second flow path section to gradually transition the flow thereby reducing the pressure drop. The transition inserts per se may have linear or curvilinear surfaces in part defining the flow path. It will be appreciated that these surfaces permit the flow to expand or contract gradually and consequently reduce pressure losses at that juncture.

In a preferred embodiment according to the present invention, there is provided an electrical machine comprising a stator core including a plurality of axially spaced stator core laminations extending normal to an axis of the machine, armature bars passing generally axially through armature bar slots in the laminations, generally radially extending ducts defining flow paths for flowing a cooling gas through the stator core, the ducts extending between a pair of axially spaced laminations and about the axially extending armature bars, the armature bars forming with the ducts steps in the flow paths and defining first and second radially spaced flow path sections of the ducts, the first flow path sections extending generally radially alongside the armature bars and the second flow path section lying radially outward of the armature bars and the first flow path section and a gas flow transition element in each flow path radially outwardly of the armature bars having a flow surface for transitioning the flow along the duct between the first and second flow path sections thereof to minimize cooling gas flow losses associated with the step.

In a further preferred embodiment according to the present invention, there is provided in an electrical machine having a stator core including a plurality of stator core laminations, armature bars passing through armature slots in the laminations and through generally radially extending ducts defining flow paths for flowing a cooling gas through the stator core, the armature bars forming steps in the flow paths and defining first and second radially spaced flow path sections of the ducts, a method of cooling the stator core comprising the step of disposing a flow transition element in the second gas path section of each duct having a transition flow surface for gradually transitioning the flow between the first and second flow path sections to minimize cooling gas flow losses associated with said step.

BRIEF DESCRIPTION OF THE DRAWINGS

FIG. 1 is an enlarged cross-sectional view of the stator ducts in accordance with a prior cooling duct design;

DETAILED DESCRIPTION OF THE INVENTION

Figure 1:
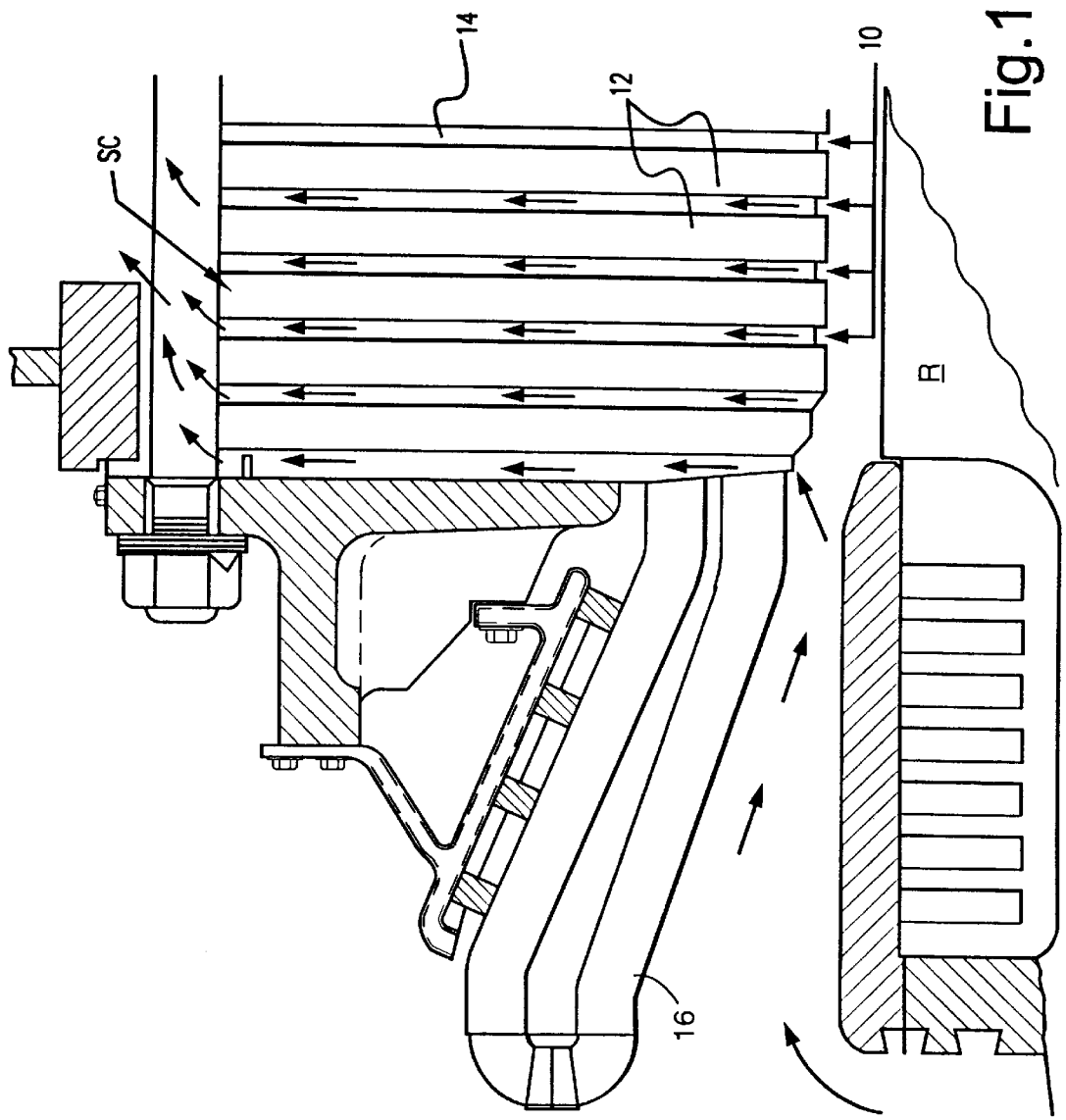
FIG. 1 is a fragmentary schematic side elevational view of an end portion of an electrical machine illustrating stator core cooling ducts forming part of the present invention.
Figure 2:
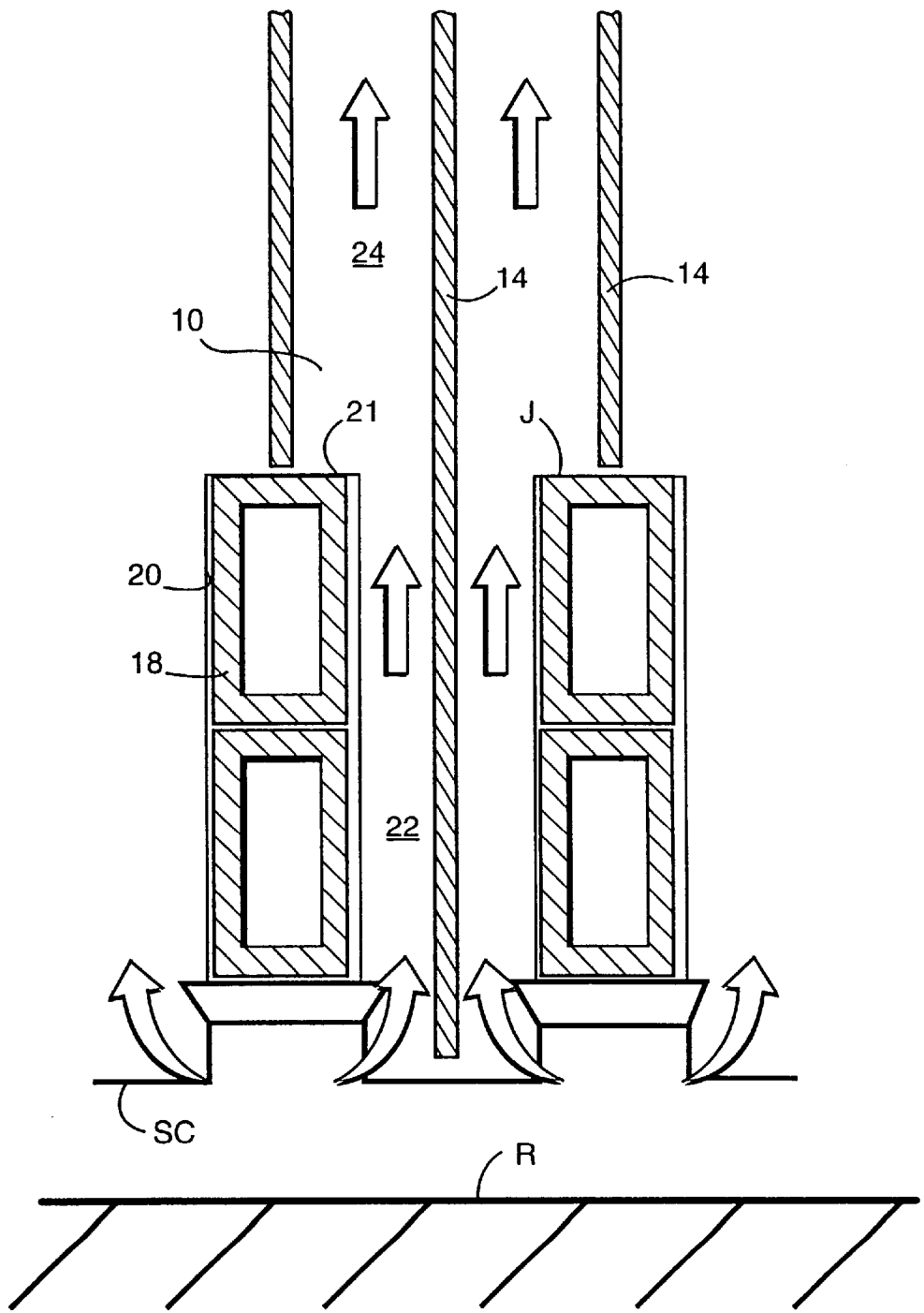

Referring now to the drawing figures, particularly to FIG. 1, there is illustrated an electrical machine comprised of a stator core SC having generally radially extending stacked layers of magnetic laminations 12. Ventilation ducts 10 are provided at axially spaced positions between groups or sets of laminations 12 and are defined in part by vent duct spacers 14 disposed between the respective groups or sets or laminations 12. Also illustrated in FIG. 1 is a portion of the rotor R and end windings 16 which form the ends of armature bars 18 passing axially through the stator core SC at circumferentially spaced positions in radially extending slots 20 (FIG. 2). The radial slots 20 extend along the inner portions of the stator core and are formed through the laminations 12. Thus, the armature bars 18 extend axially through the laminations, as well as the ducts 10. As illustrated in FIG. 2, the cooling gas in the illustrated form passes generally radially outwardly from between the rotor and the stator core into the ducts 10. It will be appreciated that the cooling gas flows radially outwardly through ducts 10 at certain axial locations of the stator core and flows radially inwardly along similar ducts at other axial locations thereof along the stator core.

Referring to FIG. 2, it will be appreciated that the armature bars 18 which extend in the ducts 10 form abrupt junctures or steps 21 in the flow path of the duct 10, i.e., the radially outer face of each armature bar extends about 90° relative to the direction of the flow path. The juncture 21 is located between first and second flow path sections of ducts 10. That is, the first flow path section 22 as illustrated in FIG. 2 extends from the entry slot of the duct adjacent rotor R to the radial outermost portion of the armature bar, while the second flow path section 24 extends from that juncture 21 radially outwardly. As noted previously, this abrupt change in direction in the flow path causes significant flow losses.

Figure 3:
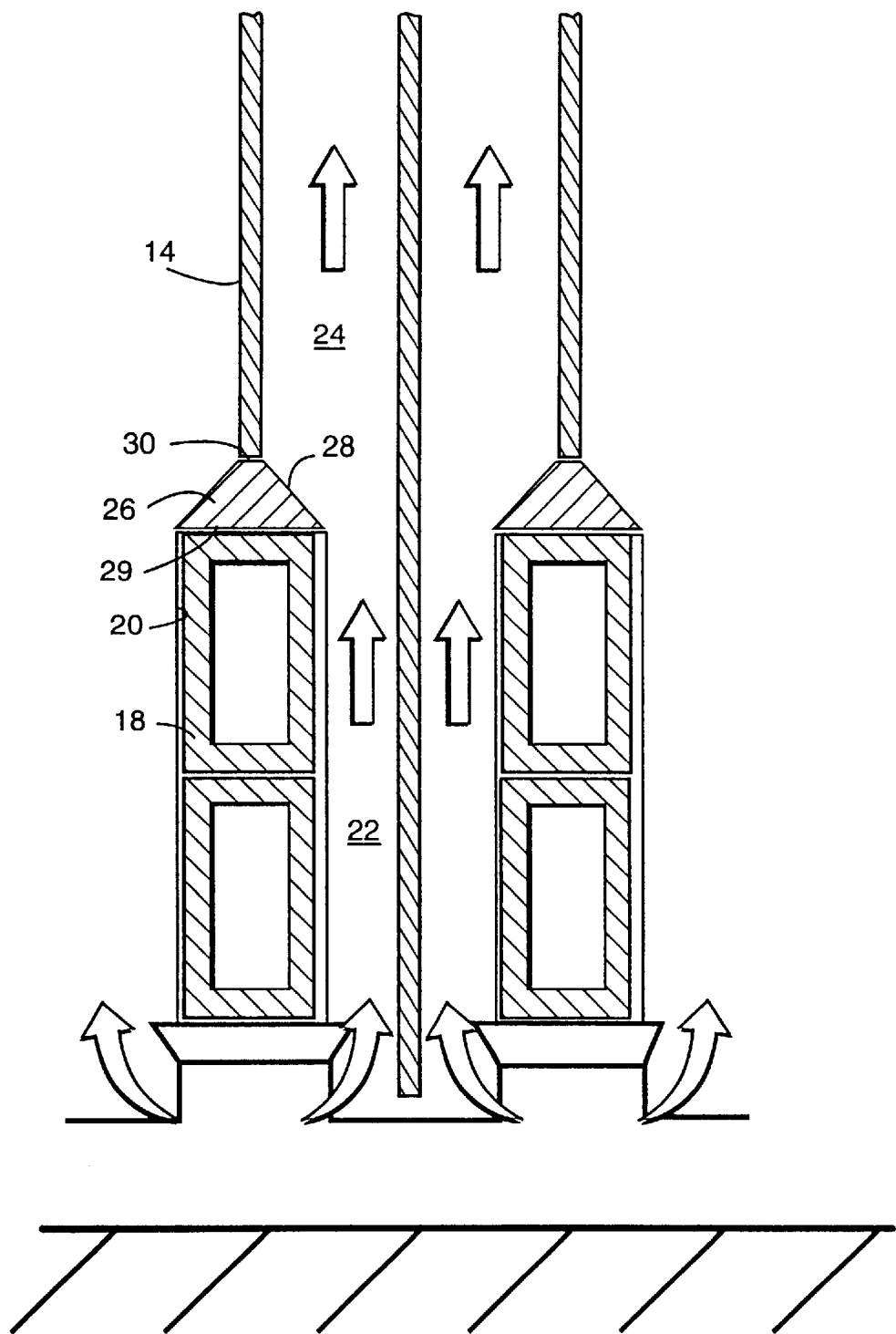
FIG. 3 is a view similar to FIG. 2 illustrating the transition inserts in the stator core cooling ducts in accordance with a preferred form of the present invention.

In accordance with the present invention and referring now to FIGS. 3 and 4, gas flow transition elements or inserts 26 may be provided in the ducts extending from the juncture 21 of the first and second flow path sections 22 and 24, respectively, radially outwardly into the second flow path section 24. It will be appreciated from a review of FIG. 3 that the transition insert 26 includes a side surface 28 forming a flow path defining surface which transitions the radial outflow of gas from the narrow passage to the larger passage, with a significant decrease in pressure losses as compared with the abrupt transition between the armature bars and the second flow path section, as illustrated in FIG. 2, at juncture 21. By gradually transitioning the flow passage, the pressure flow losses are minimized.

More particularly, the transition insert 26 as illustrated in FIG. 3 includes a body having a base 29 substantially coextensive in width with the width of the armature bar 18. Insert 26 is in the form of a triangle having its apex 30 flattened. The flattened apex 30 lies directly radially adjacent the flow guide 14 and has a width corresponding to the width of the guide 14. Thus, the insert 26 has a pair of surfaces 28 transitioning the flow in adjoining 25 ducts from the smaller first flow path section 22 to the second larger flow path section 24. It will be appreciated, however, that the same inserts may be used in the same orientation when the cooling flow is radially inwardly for transitioning the flow from the larger duct section to the smaller duct section.

Referring now to the embodiments illustrated in FIGS. 4A–4D, it will be appreciated that various forms of the transition inserts may be used in the present invention. For example, in FIG. 4A, the transition element or insert 38 may comprise a body 40 having a curvilinear flow surface 42 along opposite sides. The curvilinear surfaces form a bulbous nose projecting radially outwardly from the juncture 21 of the first and second flow path sections 22 and 24, respectively. It will be appreciated that the curvilinear surface, like the flat surface 28, gradually transitions the flow to minimize flow losses. The width of the bulbous insert at its base 46 corresponds in width to the width of the armature bar.

Figures 4A, 4B, 4C, 4D:
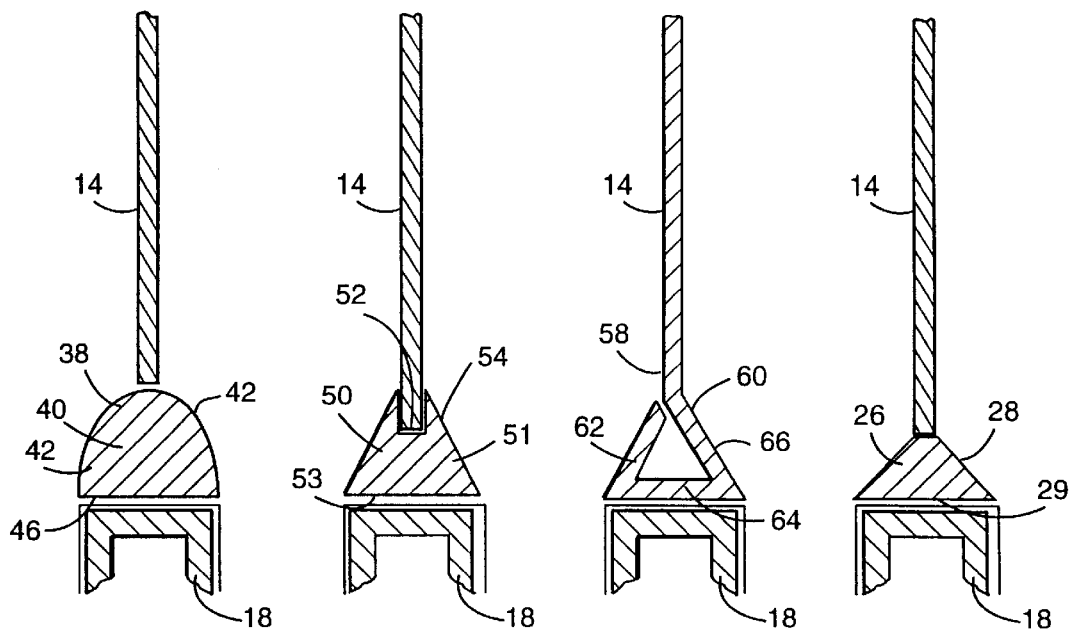
FIGS. 4A–4D illustrate four different forms of transition inserts.

In FIG. 4B, the transition element or insert 50 comprises a generally triangularly shaped body 51 having a base 53 substantially corresponding to the width of the armature bar. The opposite apex of the insert 50 has a slot for receiving a portion of the guide 14. The opposite side surfaces 54 between the base and the slot 52 serve as the transition flow surfaces for minimizing pressure losses along the stator core cooling duct.

Referring to FIG. 4C, the transition element or insert 58 may comprise a portion of the guide 14. As illustrated, the guide 60 may be formed at its inner end into a generally triangular configuration having a pair of side walls 62 and a base 64. The side walls of the insert 60 form the transition flow surfaces 66 of adjacent cooling flow ducts for reducing pressure losses. FIG. 4D is, of course, a further illustration of the transition insert illustrated in FIG. 3. It will become apparent from a review of FIGS. 4A–4D that shapes other than those shapes specifically illustrated in those drawing figures may be utilized. That is, the surfaces of the inserts defining the flow paths in the second flow path section can have different configurations, provided they perform the necessary function of forming a gradual transition between the different flow path sections to minimize pressure losses.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An electrical machine comprising:
    a stator core including a plurality of axially spaced stator core laminations extending normal to an axis of the machine;
    armature bars passing generally axially through armature bar slots in said laminations;
    generally radially extending ducts defined in part by duct spacers and said armature bars defining flow paths for flowing a cooling gas through the stator core, the ducts extending between a pair of axially spaced laminations and about said axially extending armature bars;
    the armature bars and ducts together forming steps in the flow paths and defining first and second radially spaced flow path sections of said ducts, said first flow path sections extending generally radially alongside said armature bars and said second flow path sections lying radially outward of said armature bars and said first flow path sections; and
    a gas flow transition element located at each step between an armature bar and a duct spacer in each said flow path radially outwardly of said armature bars, each said transition element having a flow surface for transitioning the flow along the duct between said first and second flow path sections thereof to minimize cooling gas flow losses associated with said step.

2. A machine according to claim 1 wherein said first and second flow path sections form a flow juncture at the radial position of said step, each said second flow path section having a larger dimension in a circumferential direction than said first flow path section, said flow surface of said transition element extending from said juncture in a generally radially outward direction transitioning the flow of gas between said first flow path section and the second flow path section having the larger circumferential dimension.

3. A machine according to claim 2 wherein said flow surface extends linearly from said juncture.

4. A machine according to claim 2 wherein said flow surface enables the flow path along radially inner portions of said second flow path section to expand gradually in a radial outward direction.

5. An electrical machine comprising:

a stator core including a plurality of axially spaced stator core laminations extending normal to an axis of the machine;

armature bars passing generally axially through armature bar slots in said laminations;

generally radially extending ducts defining flow paths for flowing a cooling gas through the stator core, the ducts extending between a pair of axially spaced laminations and about said axially extending armature bars;

the armature bars and ducts together forming steps in the flow paths and defining first and second radially spaced flow path sections of said ducts, said first flow path sections extending generally radially alongside said armature bars and said second flow path sections lying radially outward of said armature bars and said first flow path sections;

a gas flow transition element in each said flow path radially outwardly of said armature bars having a flow surface for transitioning the flow along the duct between said first and second flow path sections thereof to minimize cooling gas flow losses associated with said step;

said first and second flow path sections forming a flow juncture at the radial position of said step, each said second flow path section having a larger dimension in a circumferential direction than said first flow path section, said flow surface of said transition element extending from said juncture in a generally radially outward direction transitioning the flow of gas between said first flow path section and the second flow path section having the larger circumferential dimension;

said flow surface being a curved surface.

6. An electrical machine comprising:

a stator core including a plurality of axially spaced stator core laminations extending normal to an axis of the machine;

armature bars passing generally axially through armature bar slots in said laminations;

generally radially extending ducts defining flow paths for flowing a cooling gas through the stator core, the ducts extending between a pair of axially spaced laminations and about said axially extending armature bars;

the armature bars and ducts together forming steps in the flow paths and defining first and second radially spaced flow path sections of said ducts, said first flow path sections extending generally radially alongside said armature bars and said second flow path sections lying radially outward of said armature bars and said first flow path sections;

a gas flow transition element in each said flow path radially outwardly of said armature bars having a flow surface for transitioning the flow along the duct between said first and second flow path sections thereof to minimize cooling gas flow losses associated with said step;

each said transition element having a base generally corresponding in width to the width of the armature slot, said flow surface extending from said base of said transition element in a generally radially outward direction.

7. An electrical machine comprising:

a stator core including a plurality of axially spaced stator core laminations extending normal to an axis of the machine;

armature bars passing generally axially through armature bar slots in said laminations;

generally radially extending ducts defining flow paths for flowing a cooling gas through the stator core, the ducts extending between a pair of axially spaced laminations and about said axially extending armature bars;

the armature bars and ducts together forming steps in the flow paths and defining first and second radially spaced flow path sections of said ducts, said first flow path sections extending generally radially alongside said armature bars and said second flow path sections lying radially outward of said armature bars and said first flow path sections;

a gas flow transition element in each said flow path radially outwardly of said armature bars having a flow surface for transitioning the flow along the duct between said first and second flow path sections thereof to minimize cooling gas flow losses associated with said step;

a plurality of spacers extending generally radially between said axially spaced laminations and in part defining said ducts;

said first and second flow path sections of each duct forming a flow path juncture at the radial position of said step, each said transition element having a base generally corresponding in width with the width of the armature bar slot, flow surfaces along opposite sides of said transition element in part defining flow paths of adjacent ducts and transitioning from a width corresponding to the width of said slot to the width of a spacer.

8. In an electrical machine having a stator core including a plurality of stator core laminations, armature bars passing through armature slots in the laminations and through generally radially extending ducts defined in part by duct spacers and defining flow paths for flowing a cooling gas through the stator core, the armature bars forming steps in the flow paths and defining first and second radially spaced flow path sections of the ducts, a method of cooling the stator core comprising the step of disposing a flow transition element in the second gas path section of each duct having a transition flow surface for gradually transitioning the flow between the first and second flow path sections to minimize cooling gas flow losses associated with said step.

9. A method according to claim 8 including flowing the cooling gas along said ducts in a generally radially inward direction.

10. A method according to claim 8 including flowing the cooling gas along said ducts in a generally radially outward direction.

11. A method according to claim 8 including forming transition flow surfaces along opposite sides of said transition element in part defining portions of adjacent flow paths through adjacent ducts.

* * * * *

UNITED STATES PATENT AND TRADEMARK OFFICE
CERTIFICATE OF CORRECTION

PATENT NO.    : 6,376,945 B1
DATED         : April 23, 2002
INVENTOR(S)   : Fogarty It is certified that error appears in the above-identified patent and that said Letters Patent is hereby corrected as shown below:

Column 3,
Line 45, delete "25".

Signed and Sealed this

First Day of October, 2002

Attest:

Attesting Officer

JAMES E. ROGAN
Director of the United States Patent and Trademark Office